(12) United States Patent
Osterhage et al.

(10) Patent No.: US 10,113,940 B2
(45) Date of Patent: Oct. 30, 2018

(54) COUPLING DEVICE, PARTICULARLY FOR COUPLING DAMPING APPARATUS ON A TEST FRAME OF A TEST ARRANGEMENT AND TEST ARRANGEMENT WITH THE COUPLING DEVICE

(71) Applicant: GM GLOBAL TECHNOLOGY OPERATIONS LLC, Detroit, MI (US)

(72) Inventors: Klaus Osterhage, Rüsselsheim (DE); Juergen Fischer, Rüsselsheim (DE); Siegfried Schindler, Rüsselsheim (DE); Robert Bender, Rüsselsheim (DE)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 251 days.

(21) Appl. No.: 15/160,069

(22) Filed: May 20, 2016

(65) Prior Publication Data

US 2016/0341635 A1    Nov. 24, 2016

(30) Foreign Application Priority Data

May 21, 2015 (DE) .................... 10 2015 006 630

(51) Int. Cl.
| | | |
|---|---|---|
| *G01M 17/04* | (2006.01) | |
| *G01M 17/007* | (2006.01) | |
| *G01M 1/04* | (2006.01) | |
| *G01M 1/32* | (2006.01) | |
| *G01M 1/36* | (2006.01) | |

(52) U.S. Cl.
CPC .............. *G01M 17/04* (2013.01); *G01M 1/04* (2013.01); *G01M 1/32* (2013.01); *G01M 1/36* (2013.01); *G01M 17/007* (2013.01)

(58) Field of Classification Search
CPC ............ G01M 1/36; G01M 1/04; G01M 1/32; G01M 17/04
See application file for complete search history.

(56) References Cited

U.S. PATENT DOCUMENTS

| 4,452,015 A | 6/1984 | Jacques et al. |
|---|---|---|
| 4,973,097 A | 11/1990 | Hosan et al. |
| 5,769,191 A | 6/1998 | Cole et al. |
| (Continued) | | |

FOREIGN PATENT DOCUMENTS

| CN | 101685041 A | 3/2010 |
|---|---|---|
| CN | 201476968 U | 5/2010 |
| (Continued) | | |

OTHER PUBLICATIONS

Great Britain Patent Office, Great Britain Search Report for Great Britain Application No. 1608734.8, dated Nov. 8, 2016.

(Continued)

*Primary Examiner* — Paul West
(74) *Attorney, Agent, or Firm* — Lorenz & Kopf, LLP (57) ABSTRACT

A coupling device is disclosed for coupling a damping apparatus to a test frame of a test arrangement for testing the damping apparatus. The coupling device includes a receiving device configured to receive an adjustment device and for coupling the adjustment device with the test frame. The adjustment device includes a coupling interface for coupling with the damping apparatus. The coupling interface is variably configurable relative to the receiving device.

17 Claims, 7 Drawing Sheets

(56) References Cited

U.S. PATENT DOCUMENTS

2005/0104413 A1    5/2005   Bauman et al.
2009/0202292 A1    8/2009   Shoemaker et al.

FOREIGN PATENT DOCUMENTS

| CN | 201680977 U | | 12/2010 |
|---|---|---|---|
| CN | 102221442 A | | 10/2011 |
| CN | 202757756 U | | 2/2013 |
| CN | 203534807 U | * | 4/2014 |
| CN | 203745183 U | | 7/2014 |
| DE | 4000862 A1 | | 7/1991 |
| DE | 9307092 U1 | | 9/1993 |
| DE | 29603081 U1 | | 4/1996 |
| DE | 19828779 A1 | | 12/1999 |
| DE | 10357413 A1 | | 7/2005 |
| DE | 102004017753 A1 | | 10/2005 |
| DE | 202007004999 U1 | | 8/2008 |
| EP | 0972610 A2 | | 1/2000 |
| JP | 2009174916 A | | 8/2009 |
| KR | 100188421 B1 | | 6/1999 |
| KR | 100857202 B1 | | 9/2008 |
| KR | 20080113582 A | | 12/2008 |
| WO | 2010072126 A1 | | 7/2010 |

OTHER PUBLICATIONS

German Patent Office, German Search Report for German Application No. 102015006631.5, dated Jan. 22, 2016.
Great Britain Patent Office, Great Britain Search Report for Great Britain Application No. 1608736.3, dated Oct. 14, 2016.
German Patent Office, German Search Report for German Application No. 102015006630.7, dated Jan. 25, 2016.

* cited by examiner

COUPLING DEVICE, PARTICULARLY FOR COUPLING DAMPING APPARATUS ON A TEST FRAME OF A TEST ARRANGEMENT AND TEST ARRANGEMENT WITH THE COUPLING DEVICE

CROSS-REFERENCE TO RELATED APPLICATION

This application claims priority to German Patent Application No. 102015006630.7, filed May 21, 2015, which is incorporated herein by reference in its entirety.

TECHNICAL FIELD

The present disclosure pertains to a coupling device configured particularly for coupling a damping apparatus to a test frame of a test arrangement, and further relates to a test arrangement including the coupling device for testing at least one damping apparatus.

BACKGROUND

Test arrangements for damping apparatuses designed to dampen the pivoting of a motor vehicle lift gate about a pivot axis are used to test the function of said damping apparatuses. A damping apparatus to be tested is connected to the lift gate in such manner that the lift gate is damped when executing a pivoting motion about the pivot axis. The functional capability of the damping apparatus is tested in this way.

A test system for simulating an air spring for a pivoting tailgate of a motor vehicle is described in CN 101 685 041 B. The test system makes it possible to simulate the function of the air spring and the tailgate in conditions as close as possible to real life practice. In particular, a planned installation position and weight of the tailgate are simulated.

SUMMARY

The present disclosure provides a functionally improved coupling device to secure a damping apparatus to a test arrangement. The coupling device includes a receiving device and an adjustment device. The receiving device is designed to receive the adjustment device and to couple the adjustment device with the test frame. The adjustment device has a coupling interface for coupling with the damping apparatus.

The coupling device is designed for coupling a damping apparatus to a test arrangement. The test arrangement is preferably designed for testing the at least one damping apparatus, and more preferably at least two of the damping apparatuses, particularly exactly two of the damping apparatuses. The damping apparatus is in the form of a gas pressure spring, for example. The damping apparatus is designed to dampen a vehicle flap, in particular a lift gate, tail gate or boot flap, (also called a trunk or deck lid) that pivots about a tailgate pivot axis. The tailgate is designed as a lift gate, particularly a luggage compartment door or tailgate of the motor vehicle. The door can preferably be pivoted about the tailgate pivot axis from a closed position into an open position. The at least one damping apparatus assists an opening motion from the closed into the open position and damps a closing motion from the open position into the closed position.

The test arrangement includes a test stand with a pivot axis, which is designed as a simulation of the tailgate pivot axis. In particular, the pivot axis of the test stand simulates the function of the tailgate pivot axis. The test arrangement includes the test frame constructed as a functional model of the tailgate. The test frame preferably has a center of gravity and a total mass. The center of gravity is preferably designed to be a center of mass of the test frame. In particular, the test frame a tailgate center of gravity, a tailgate total mass and/or tailgate kinematics is and/or can be reconstructed in the center of gravity, the total mass and/or the kinematics of the test frame.

The test frame has a connecting device for coupling with the test stand in such manner as to be pivotable about the pivot axis. For example, the connecting device makes it possible to realize a positive and/or non-positive connection between the test frame and the test stand that is pivotable about the pivot axis.

The test arrangement includes the at least one damping apparatus, preferably at least two damping apparatuses, particularly exactly two damping apparatuses. The damping apparatus is designed to enable the test frame to pivot in damped manner about the pivot axis. In particular, the damping apparatus supports the opening motion simulated by the test frame and dampens the closing motion simulated by the test frame.

The coupling device has a receiving device and an adjustment device. The receiving device is designed to accommodate the adjustment device and couple it with the test frame. The adjustment device has a coupling interface, which is designed for coupling with the damping apparatus. The coupling interface is variably adjustable relative to the receiving device. The coupling interface is preferably displaceable by the adjustment device in at least two rotational degrees of freedom, particularly in exactly two rotational degrees of freedom.

It is advantageous that the coupling device is designed to connect the damping apparatus to the test frame universally. A large number of different tailgates can be reconstructed realistically by the test frame. The variable adjustability of the coupling interface enables tailgate connection points for a wide range of tailgates to reconstruct very realistically on the test frame, and particularly positioned in the test arrangement. This enables a flexible connection to the test frame to be made, and testing of damping apparatuses can be carried out more quickly and less expensively.

In a preferred variant of the present disclosure, the adjustment device includes an engaging device which is designed to engage in the receiving device. In particular, the engaging device is designed to engage slidably in the receiving device. Optionally, the adjustment device slideable in a first direction, which follows the length of the receiving device. This enables the adjustment device to be positioned and fixed variably in the receiving device. The sliding capability along the engaging device advantageously guarantees that a distance between the adjustment device and a plane at an angle, particularly a right angle, to the pivot axis and/or a distance between the adjustment device and a rail of the test frame is variably configurable. Particularly preferably, a distance between the coupling point and the plane and/or the rail is variably configurable. This enables a positioning of the tailgate coupling point to be simulated realistically.

In a preferred design variant of the present disclosure, the engaging device has at least one detent component, and preferably two or more detent components. The receiving device preferably has at least one recess, in which the at least one detent component is or can be secured in a form-fitting manner. A form-fitting lock is preferably formed between the at least one receiving device and the at least one detent component in a second direction at an angle, particularly at right angles to the first direction. In this way, it is advantageously ensured that the adjustment device is and/or can be connected securely to the receiving device and at the same time displacement in the first direction is assured.

In a preferred variant of the present disclosure, the adjustment device includes a foot, a neck and a head. The foot is preferably connected directly or indirectly to the receiving device. In particular, the foot is arranged on the side or the top of the engaging device. The foot supports the neck, for example. In particular, the head is arranged on the neck and/or is connected thereto, preferably in non-rotating manner. For example, the foot and/or the neck is/are constructed with an L-shaped lateral profile or substantially in an L-shape. In particular, the foot and the neck each has/have one short and one long leg, which forms the L-shape of the foot and the neck. The neck is particularly preferably connected by its long leg to the long leg of the foot.

In a preferred embodiment of the present disclosure, the head includes the coupling interface, which is particularly designed for coupling with the damping apparatus. Optionally, the coupling interface is designed to create a positive and/or non-positive coupling with the damping apparatus. The coupling interface is spherical, for example.

In a preferred implementation of the present disclosure, the at least one damping apparatus has a mating coupling interface, with which it is and/or can be coupled in positive and/or non-positive locking manner to the coupling interface. The mating coupling interface is designed for example as a hemispherical hollow body. In particular, in its spherical form, the coupling interface engaged and/or can engage in the hemispherical mating coupling interface.

In a preferred embodiment of the present disclosure, the foot is rotatable about a first axis of rotation relative to the engaging device. The neck is rotatable about a second axis of rotation relative to the foot, preferably together with the head. The foot and the neck are particularly preferably arranged in a kinematic chain with one another. In this way, the neck is rotatable relative to the engaging device about the first axis of rotation together with the foot.

A preferred implementation of the present disclosure provides that the coupling interface defines a coupling point. The adjustment device is preferably designed to adjust the coupling point. The damping apparatus preferably is and/or can be coupled into the coupling point. The coupling point is preferably arranged in fixed manner in the at least two rotational degrees of freedom, independently of the displacement of the adjustment device. The coupling point is preferably arranged in fixed manner independently of a first and a second axis. The first and second axes extend at an angle, particularly at right angles to each other and to a third axis. The third axis extends through the middle of the coupling interface and through a connection between the coupling interface and the neck. For example, the first axis corresponds for example to the first pivot axis, and the second axis corresponds to the second pivot axis, so that the coupling point is arranged in fixed manner independently of an angle of rotation of the foot about the first pivot axis and/or independently of an angle of rotation of the neck about the second pivot axis.

A preferred variant of present disclosure provides that the first and the second axes of rotation extend at an angle, particularly at right angles to each other. Optionally, the first and second axes of rotation cross one another at an intersection point. It is particularly preferable, that the coupling interface and/or the coupling point is permanently arranged at the intersection point of the two pivot axes, particularly independently of an angle of rotation of the foot about the first pivot axis and/or independently of an angle of rotation of the neck about the second pivot axis.

The arrangement of the coupling interface and/or the coupling point at the intersection is particularly independent of the adjustment of the angle of rotation of the foot and/or of the neck. The arrangement of the coupling interface and/or the coupling points is also independent of parameters such as any fixing of the center of gravity of the test frames, such as any fixing of distances inside the test stand, the test frames and/or the at least one rail, particularly independently of the positioning of the coupling device relative to the test frame and/or to the at least one rail.

It is particularly preferable if a relative angle between the coupling interface and the mating coupling interface is variously configurable by displacing the coupling device via the adjustment device in the at least two rotational degrees of freedom, particularly by displacing the angle of rotation of the foot about the first pivot axis and by displacing the angle of rotation of the neck about the second pivot axis. Specifically, the relative angle between the coupling interface and the mating coupling interface is configurable independently of at least one, preferably of all parameters described previously. Thus, it may be ensured that no snagging and/or jamming occurs when the damping apparatus is coupled to the respective coupling interface. In particular, a simple and secure coupling of the damping apparatus to the coupling interface is guaranteed.

The present disclosure also provides a test arrangement that is designed for testing the at least one damping apparatus. The test arrangement includes the test stand with the pivot axis, which has the form of a simulation of the tailgate pivot axis. The test arrangement includes the test frame, which has the form of a functional model of the tailgate. The test frame includes the connecting device, via which it is and/or can be connected to the test stand such manner as to be pivotable about the pivot axis. The test arrangement includes the at least one damping apparatus, preferably at least two damping apparatuses, particularly exactly two damping apparatuses, for damped pivoting of the test frame about the pivot axis. The test arrangement includes the coupling device, preferably at least two coupling devices, particularly exactly two coupling devices, according to the preceding description. Since the test arrangement includes the at least one damping apparatus, preferably at least two of the damping apparatuses, and since the test frame forms a functional model of the tailgate, the functional capability of the damping devices may advantageously be tested in actual operation of the tailgate.

In a preferred variant of the present disclosure, the total mass of the test frame, the center of gravity of the test frame and/or the coupling point, preferably at least two or exactly two coupling points of at least two or exactly two coupling devices can be variably fixed and/or adjusted. In this way the total mass of the tailgate, the center of gravity of the tailgate and/or at least one coupling point of the tailgate for coupling with at least one damping apparatus may be realistically reconstructed and/or simulated with the tailgate. The variable configuration particularly allows a large number of tailgates of any design, with different tailgate total masses, tailgate centers of gravity and/or tailgate coupling points to be realistically reconstructed. In particular, the test arrangement can be used flexibly to test damping apparatuses of variously designed tailgates in actual operation. Specifically, the test frame can be adapted simply and quickly to a very wide range of tailgate variations. In this way, a dynamic behavior of the various tailgates may be reconstructed with the test frame. Configuration data for the test arrangement, particularly the test frame, can preferably be calculated using a spreadsheet calculation. In this way, the configurability and variability of the test arrangement may be further enhanced in the application, with the result that fast, effective and inexpensive testing of the at least one damping apparatus may be assured.

A preferred variant of the present disclosure provides that the test frame includes at least one, preferably at least two, particularly exactly two rails. The rail is designed as at least one profile rail, for example. This advantageously enables devices and/or apparatuses that are arranged in a profile on the at least one rail to be moved in sliding manner. When two or more rails are provided in the test frame, the rails may optionally be aligned, particularly parallel, with one another.

The rail preferably includes the coupling device. One coupling device is preferably assigned to each rail. Preferably, the damping apparatus, particularly exactly one damping apparatus, is and/or can be connected to the respective rail via the coupling device. In particular, the damping apparatus can be coupled to the rail via the coupling device.

In a preferred implementation of the present disclosure, the coupling device is slideable along the respective rail. For example, the coupling device is in the form of a carriage that is slideable along the respective rail, particularly a profile rail. The result of this is that a distance may be configured variably between the pivot axis and the coupling device, particularly the adjustment device. In particular, a distance between the pivot axis and the coupling point may be configured variably. Since it is displaceable along the rail, the position of the coupling device and/or the coupling point may be set independently of the relative angle between the coupling interface and the mating coupling interface and/or substantially independently of the center of gravity of the test frame. This makes it possible to simulate the positioning of the tailgate coupling point realistically.

A preferred implementation of the present disclosure provides that the test frame has at least one mass compensation device. For example, the mass compensation device is in the form of at least one weight component with variable mass that can be attached to the test frame. The mass compensation device makes it possible for the center of gravity of the test frame to be fixed and shifted at will.

The mass compensation device preferably includes at least one first mass compensation device, the mass of which can be altered and which is arranged in fixed manner on the test frame. Optionally in addition, the at least one mass compensation device includes at least one second mass compensation device, the mass of which can be altered and which is arranged movably on the test frame. The change of position of the at least one second mass compensation device may be effected for example by sliding it along the at least one rail. The total mass and the center of gravity of the test frame are variably fixable and/or configurable by means of the at least one mass compensation device with alterable mass and/or position. Within the scope of the present disclosure, it is also possible that the at least one second mass compensation device includes a first and a second mass compensation device whose location can be changed, which are slideable along the two rails. In this way it is advantageously possible to ensure that the position of the center of gravity remains fixed and/or is not shifted when the two position-variable mass compensation devices are shifted, particularly by an equal distance in opposite directions. The mass moment of inertia of the test frame is preferably variably adjustable about the pivot axis, particularly independently of the fixed position of the center of gravity, by sliding of the two position-variable mass compensation devices. In this way, the test frame may advantageously be adapted to any tailgates with different tailgate total masses and tailgate centers of gravity, and realistically simulate the dynamics thereof in the text bench.

BRIEF DESCRIPTION OF THE DRAWINGS

The present disclosure will hereinafter be described in conjunction with the following drawing figures, wherein like numerals denote like elements.

Equivalent or identical parts in the figures are denoted with the same reference signs in each case.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
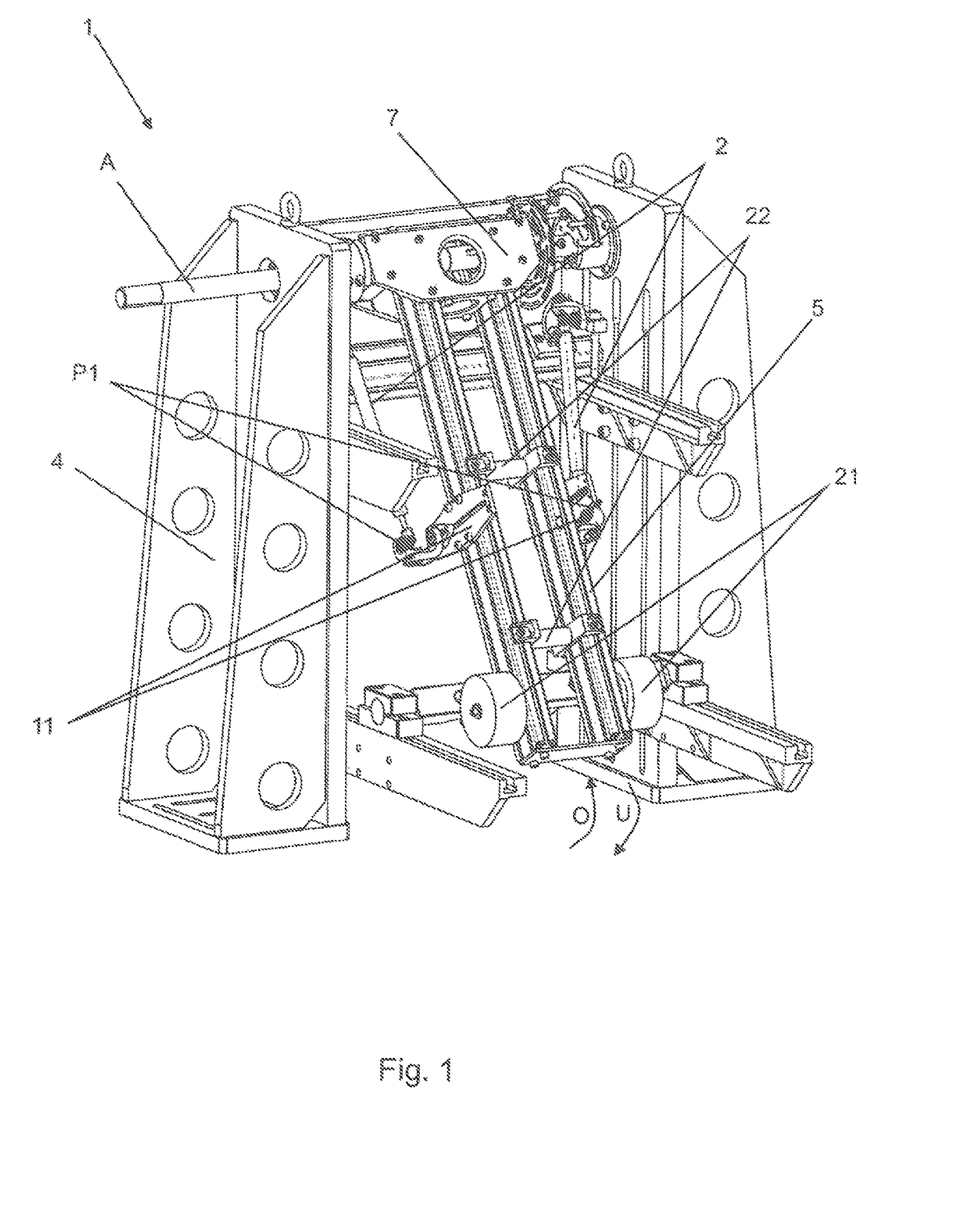
FIG. 1 is a perspective front view of a test arrangement with a test stand, a pivot axis, two damping apparatuses and a test frame.
Figure 2:
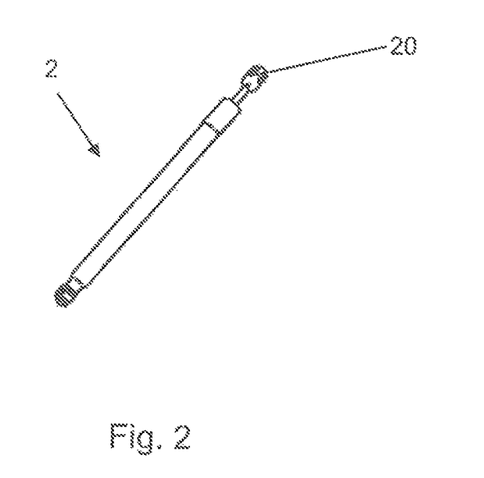
FIG. 2 is a perspective plan view of one of the two damping apparatuses of FIG. 1.

FIG. 1 shows a test arrangement 1 for testing the function of damping apparatuses 2. A perspective view of one of the damping apparatuses 2 is provided in FIG. 2. Damping apparatuses 2 have the form of gas pressure springs, for example. They are designed to damp a tailgate 3 that is pivotable about a tailgate pivot axis Ak. According to FIG. 3A, tailgate 3 is in the form of a lift gate, particularly a tailgate or luggage compartment lid of a motor vehicles 6, particularly a passenger vehicle.

Figure 3A:
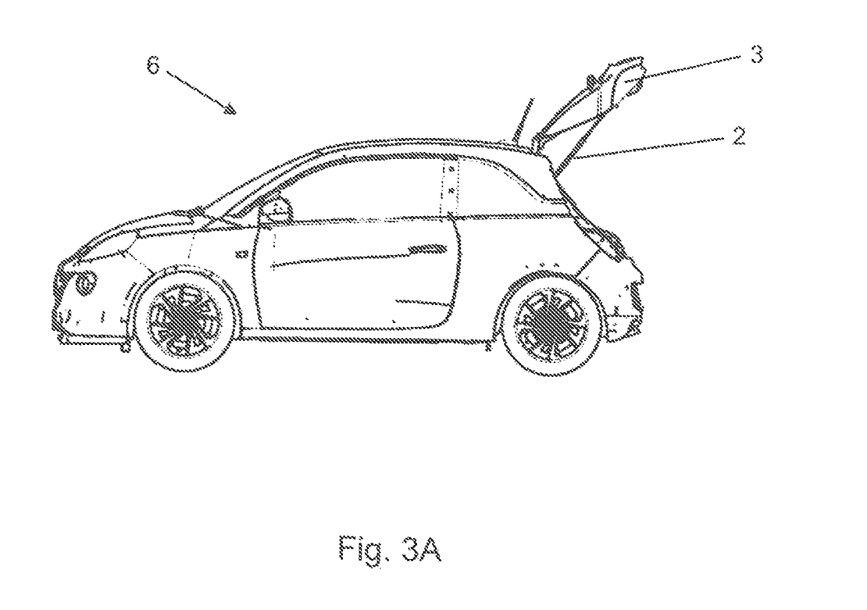
FIG. 3A shows a motor vehicle with a tailgate that is pivotable about a real pivot axis.
Figure 3B:
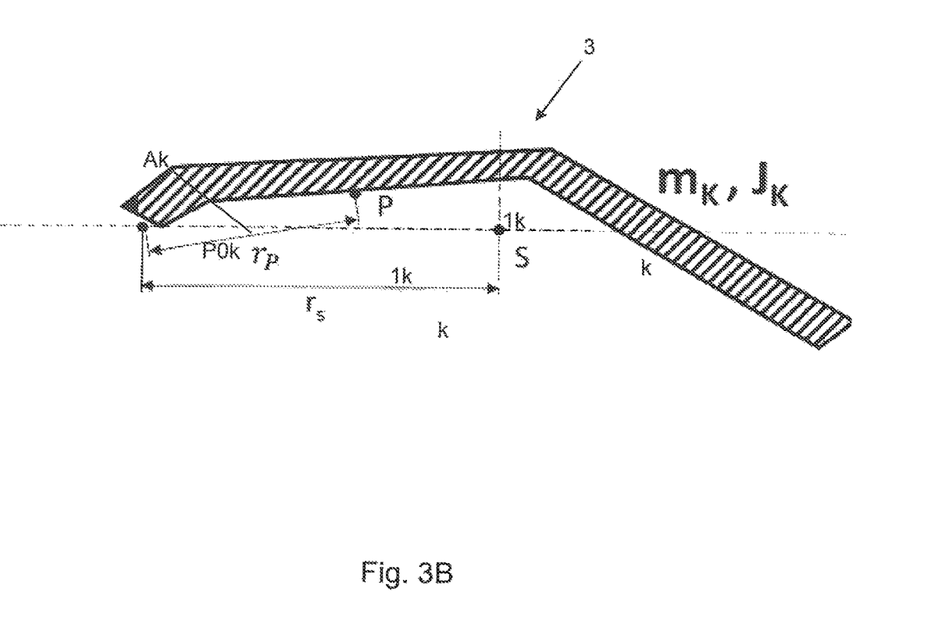
FIG. 3B is a sectional view of the lift gate of FIG. 3A, wherein a sectional line extends from the real pivot axis to a movable end of the lift gate.

Tailgate 3 is shown in a sectional view in FIG. 3B, wherein the sectional line extends from the tailgate pivot axis Ak to a free end of tailgate 3. Tailgate 3 has a tailgate total mass mk and a tailgate center of gravity Sk. Tailgate 3 is pivotable from a closed position into an open position as shown in FIG. 3A by an opening motion about the tailgate pivot axis Ak. Tailgate 3 is pivotable by a closing motion about tailgate pivot axis Ak from the open position into the closed position. Damping apparatuses 2 support the opening motion and damp the closing motion of tailgate 3.

Damping apparatuses 2 are fastened to the motor vehicle as shown in FIG. 3A. Each of the damping apparatuses 2 is connected to tailgate 3 as shown in FIG. 3B in a tailgate connection point P1k. For this purpose, each of the damping apparatuses 2 has a mating coupling interface 20 (FIG. 2), via which the respective damping apparatus 2 is coupled in positive and/or non-positive locking manner to the tailgate 3 (not shown) at the tailgate connection point P1k. The mating coupling interface 20 is also designed to enable coupling in positive and/or non-positive locking manner to a coupling interface 19 (FIG. 6) of test arrangement 1.

An intersection between a plane of symmetry of tailgate 3 which extends perpendicularly to tailgate pivot axis Ak and tailgate pivot axis. Ak is identified with P0k. During a pivoting motion about tailgate pivot axis Ak, tailgate 3 has a tailgate moment of inertia Jk about point P0k.

In the table below, the characteristic variables of the flap are identified:

| Abbreviation | Description |
| --- | --- |
| Ak | Tailgate pivot axis |
| P0k | Intersection between the plane of symmetry of the tailgate extending perpendicularly to the pivot axis and the tail gate pivot axis |
| P1k | Tailgate connection point |
| Sk | Tailgate center of gravity |
| rsk | Distance Tailgate pivot axis - Tailgate center of gravity |
| rp1k | Distance Tailgate pivot axis - Tailgate connection point |
| mk | Tailgate total mass |
| Jk | Tailgate moment of inertia about P0k |

According to FIG. 1 test arrangement 1 includes a test stand 4 and a test frame 5. Test stand 4 has a pivot axis A, which is designed as a simulation of tailgate pivot axis Ak. In particular, pivot axis A is a simulation on test stand 1 of tailgate pivot axis Ak on motor vehicle 6.

Figure 4A:
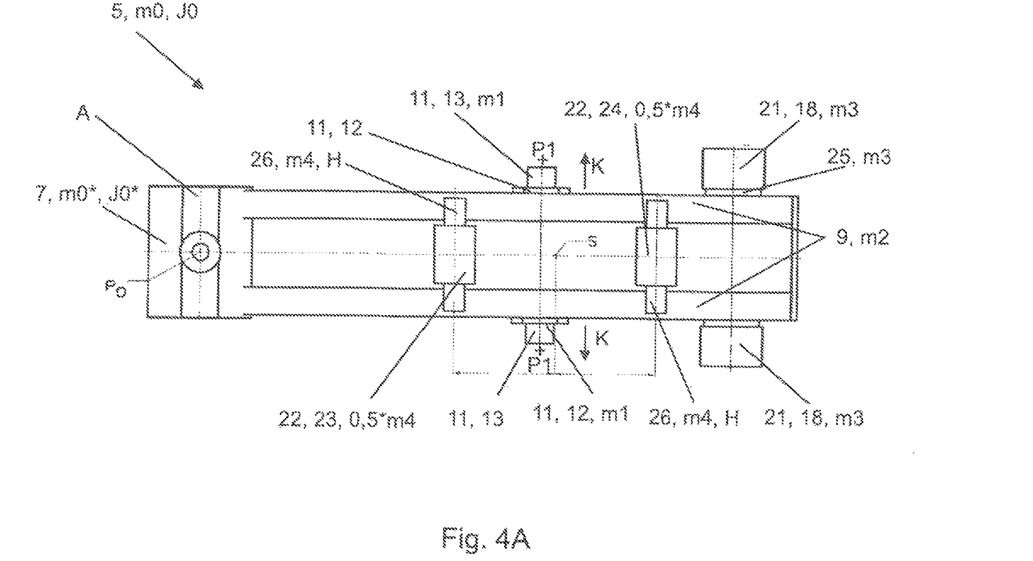
FIG. 4A is a top view of the test frame of FIG. 1.
Figure 4B:
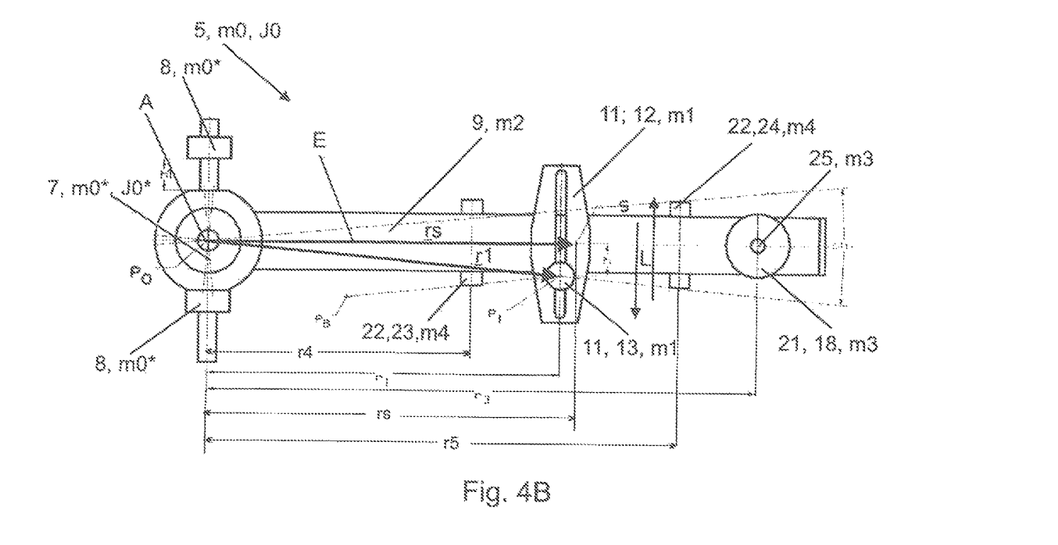
FIG. 4B is a side view of the test frame of FIG. 4A.
Figure 4C:
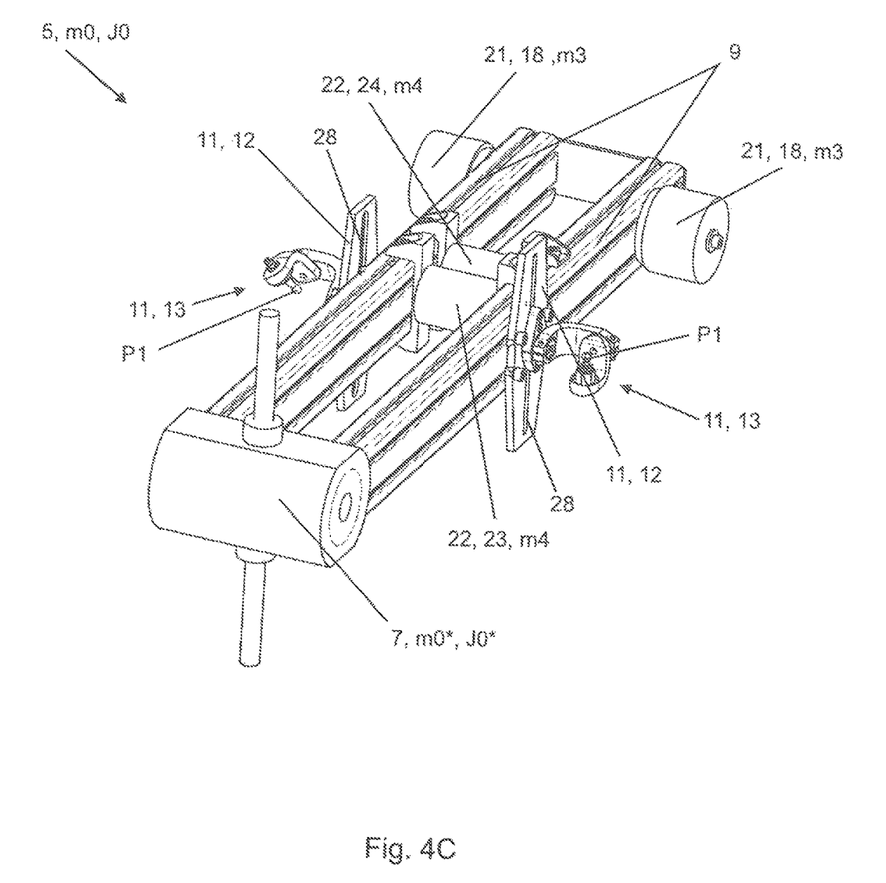
FIG. 4C is a perspective plan view of the test frame of FIGS. 4A and 4B.

Test frame 5 is a functional model of tailgate 3. It has a center of gravity S (FIGS. 4A, 4B) and a total mass m0 (FIGS. 4A, 4B, and 4C). An intersection between a plane of symmetry of test frame 5, which is arranged perpendicularly to pivot axis A, and pivot axis A is identified with P0. When a pivot motion is made about pivot axis A, test frame 5 has a total moment of inertia J0 about point P0.

Between pivot axis A or point P0 and center of gravity S. A distance rs is created. The center of gravity S and the total mass m0 of test frame 5 are variably fixable and/or configurable. This enables test frame 5 to simulate a wide range of different tailgate 3 with their associated tailgate centers of gravity Sk and tailgate total masses m0k.

As shown in FIG. 1, test frame 5 includes a connecting device 7, via which it can be and/or is connected pivotably to pivot axis A. Test frame 5 has total moment of inertia J0, with which it is pivotable upwards O about pivot axis A. In this way, particularly the opening motion of tailgate 3 can be simulated. Test frame 5 is also pivotable downwards U about pivot axis A with total moment of inertia J0, in order to simulate the closing motion of tailgate 3. When pivoting upwards O or downwards U, test frame 5 pivots about pivot axis A through a pivot angle phi (FIG. 4B). The opening motion supported in damping manner by the damping apparatuses 2 under test, and the closing motion is damped by damping apparatuses 2.

The damping apparatuses 2 to be tested with test arrangement 1 are fixed and/or fixable on test stand 4. Each of the damping apparatuses 2 is coupled to test frame 5 at a respective coupling point P1. Coupling point P1 is variably definable and/or configurable relative to test frame 5 and/or test stand 4, for the purpose of realistically simulating tailgate 3 and the connection points thereof P0k (FIG. 3B).

FIG. 4A shows a top view of test frame 5. FIG. 4B shows a side view of the test frame, and FIG. 4C is a perspective view of connecting device 7. Test frame 5 is and/or can be connected pivotably to pivot axis A via connecting device 7. Connecting device 7 has an axis-side hub mass m0* auf Axis-side hub mass m0* can be altered by means of at least one further weight component 8. A distance h1 (FIG. 4B) between the at least one further weight component 8 and point P0 is variably configurable. The shift in the center of gravity that is caused by sliding adjustment device 13 with mass nil along the respective receiving device 13 can be compensated by sliding the at least one further weight component 8 having m0* a corresponding distance h1 along pivot axis A. In particular, weight component 8 is moved distance h1 when configuring distance h (FIG. 4B) between adjustment device 13, particularly between coupling point P1 and a plane E defined by pivot axis A and center of gravity S. Therefore the following preferably applies: h=h1.

According to FIGS. 4A and 4C, test frame 5 includes at least two rails 9, in the form of at least two profile rails. The at least two rails 9 are connected pivotably to connecting device 7, so that they are pivotable about pivot axis A together with connecting device 7. The rails have a mass m2 and an intrinsic moment of inertia J2.

Test frame 5 includes a first mass compensation device 21 and at least one second mass compensation device 22. The mass compensation devices 21, 22 may be used to fix the center of gravity S of test frame 5 variably. First mass compensation device 21 is arranged at distance r3 from pivot axis A on rails 9 by means of at least one holder 25. First mass compensation device 21 consists of a weight component 18 which is arranged in fixed manner on test frame 5, particularly in fixed manner on rails 9. Is has a mass m3, which can be varied by substituting weight components 18. Holder 25 has mass m3,H.

At least one second mass compensation device 22 is formed by a front weight component 23, movable towards pivot axis A and a rear weight component 24, movable away from pivot axis A. Weight components 23, 24 are each arranged on rails 9 in an additional holder 26 and supported so as to be displaceable in rails 9. In particular, additional holders 26 constitute carriages which are slideable along the rails.

Figure 6:
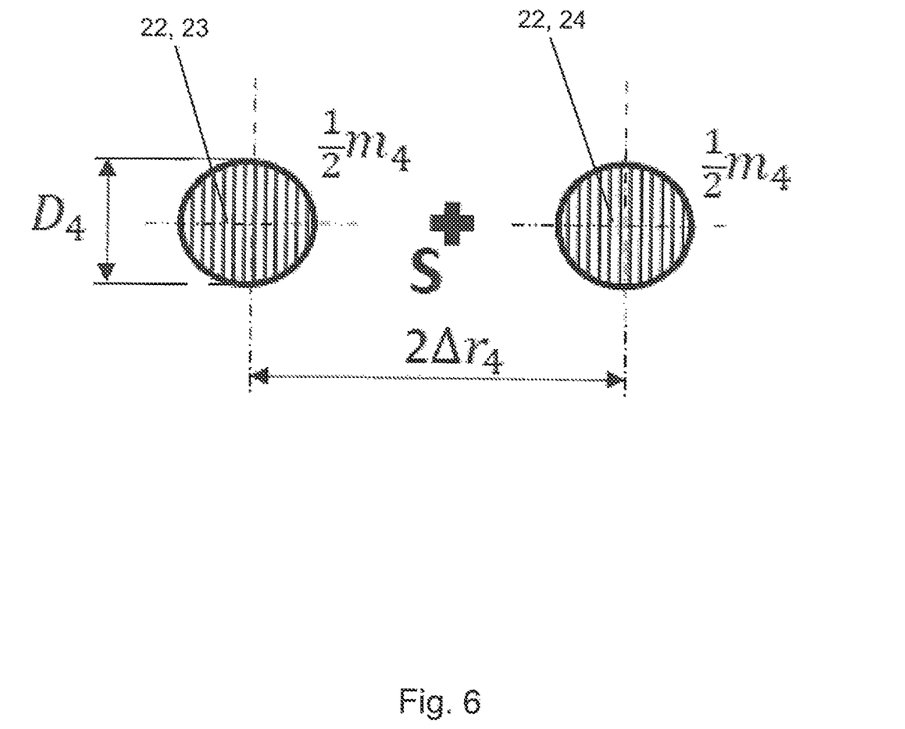
FIG. 6 shows an arrangement of two weight components relative to a center of gravity of the test frame.

FIG. 6 shows front and rear weight components 23, 24 in a position relative to center of gravity S. Both weight components 23, 24 cylindrical and/or have an annular cross section. Each weight component 23, 24 has a uniform diameter D4. Both weight components 23, 24 together have the same mass m4 as second mass compensation device 22, wherein mass m4 is distributed equally between the two weight components 23, 24. Thus, each weight component has a mass of 0.5*m4. The additional holders 26 have a combined mass m4,1=1, which is also distributed equally to the two holders 26.

The sliding capability of additional holders 26 and the front and rear weight components 23, 24 along rails 9 means that their position relative to pivot axis A can be changed. In particular, a distance r4 (FIG. 4B) may be set variably between pivot axis A or point P0 and front weight component 23, and a distance r5 (FIG. 4B) may be set variably between pivot axis A or point P0 and rear weight component 24. Accordingly, a distance delta r4 (Δr4) between any weight component 23, 24 and center of gravity S is also variably configurable.

The effect of moving additional holders 26 and front and rear weight components 23, 24 by the same distance in opposite directions along rails 9, is that the center of gravity remains fixed and/or its position is not shifted. On other hand, the mass moment of inertia m0 of test frame 5 about pivot axis A is variably configurable by moving said elements as described above.

Test frame 5 has a coupling device 11 on each of the at least two rails 9. The respective damping apparatus 2 can be coupled with test frame 5, particularly with the respective rail 9 via coupling device 11 in coupling point P0.

Coupling device 11 includes a receiving device 12 and an adjustment device 13. Receiving device 12 has a mass m1,H and an intrinsic moment of inertia J1,H, Receiving device 12 is designed to receive adjustment device 13. It is movable along the respective rail 9, so that a distance r1 (FIG. 4B) between pivot axis A or point P0 and receiving device 12 is variably configurable. Thus, distance r1 between pivot axis A or point P0 and adjustment device 13, particularly coupling point P1, is also variably configurable. In particular, the position of coupling device 11 may be configured independently of a relative angle at which the respective damping apparatus 2 is coupled to coupling device 11, and/or substantially independently of the center of gravity S of test frame 5.

Adjustment device 13 is designed to adjust coupling point PT. It includes an engaging device 14 (FIG. 5), with which it engages in receiving device 12 and is slideable along receiving device 12 in a first direction and the opposite direction L. Thus, a distance h (FIG. 4B) is variably configurable between coupling point P1 and a plane E, which is defined by pivot axis A and center of gravity S.

Figure 5:
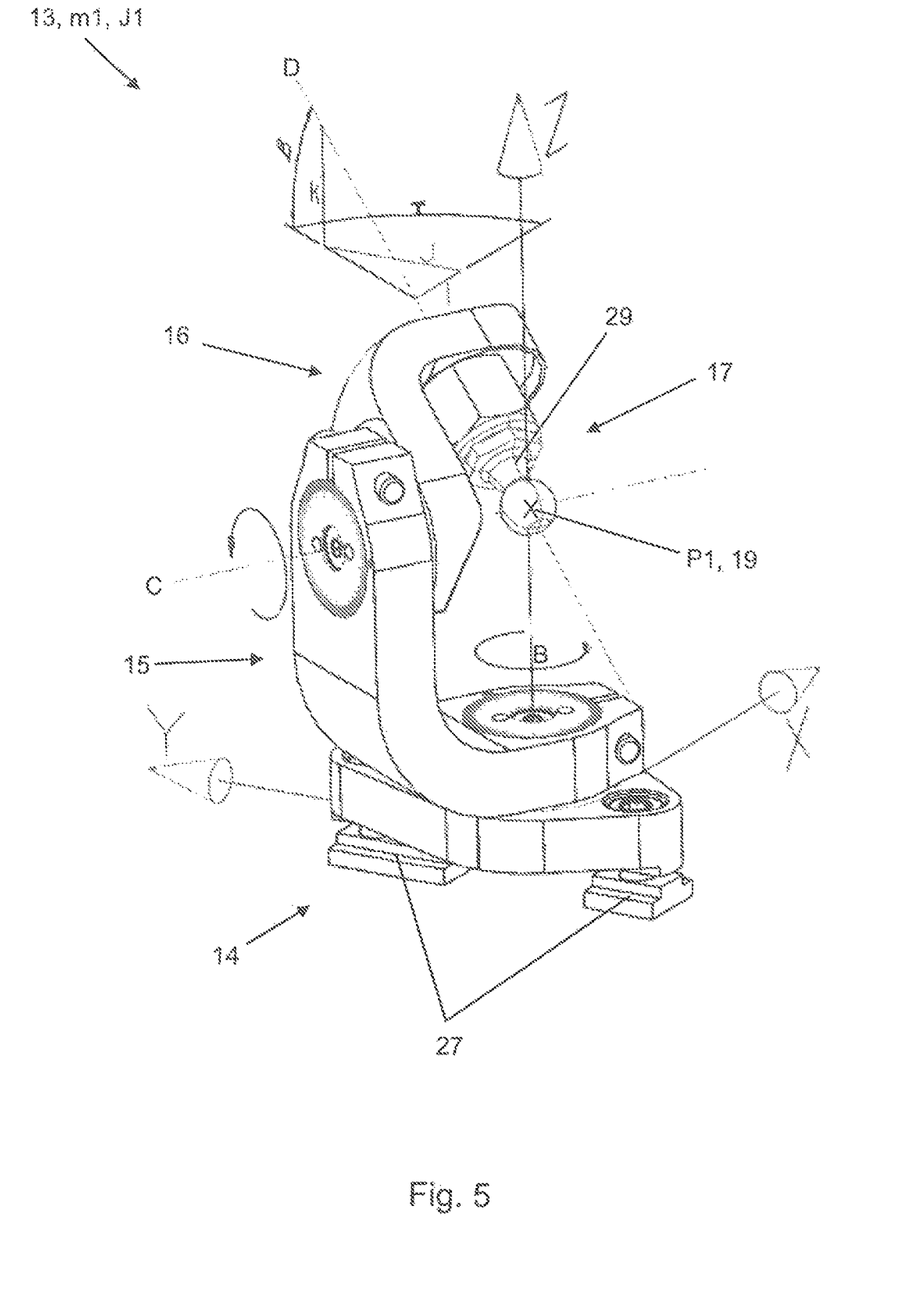
FIG. 5 is a perspective front view of an adjustment device of the test arrangement.

FIG. 5 is a perspective front view of adjustment device 13. Adjustment device 13 has a mass m1 and an intrinsic moment of inertia J1. Adjustment device 13 includes engaging device 14, with which adjustment device 13 engages in a recess 28 in receiving device 12 so that it can be moved slidably along the receiving device.

Engaging device 14 includes at least one detent component 27, for example two detent components 27. Detent components 27 are designed to engage in positive locking manner in recess 28 of receiving device 12. The positive lock is formed in a second direction K, extending at an angle, particularly at right angles to the first direction and reverse direction (L).

Adjustment device 13 has a foot 15, a neck 16 and a head 17. Foot 15 is arranged on the side or on top of engaging device 14. Foot 15 supports neck 16. The head is arranged on neck 16.

Foot 15 and neck 16 are L-shaped, each consists of one short leg and one long leg. Foot 15 is supported on engaging device 14 by its short leg and is rotatable with respect thereto. Neck 16 is connected by its long leg to the long leg of foot 15, and is also rotatable with respect thereto. Head 17 is arranged non-rotatably on the short leg of neck 16.

Foot 15 is rotatable about a first axis of rotation B relative to engaging device 14. Neck 16 is rotatable about a second axis of rotation C relative to foot 15. Foot 15 and neck 16 are arranged in a kinematic chain. Accordingly, neck 16 and foot 15 are rotatable together about the first axis of rotation B relative to engaging device 14.

Head 17 is connected non-rotatably to neck 16, so that head 17 is rotatable together with neck 16 about the second axis of rotation C relative to foot 15 and together with neck 16 and foot 15 about the first axis of rotation B relative to engaging device 14.

Rotating foot 15 about the first axis of rotation B has the effect of rendering head 17 rotatable through an angle of rotation gamma ($\gamma$) relative to engaging device 14. Additionally, rotating neck 16 about second Axis of rotation C has the effect of rendering head 17 rotatable through an angle of rotation beta ($\beta$) relative to foot 15.

First axis of rotation B extends vertically or substantially vertically, and second axis of rotation C extends horizontally or substantially horizontally, when adjustment device 13 with engaging device 14 stands on an uneven foundation. Both axes of rotation B, C extend at an angle to each other, particularly at right angles, and they meet and intersect at an intersection point X.

Head 17 includes coupling interface 19, which is designed to couple with mating coupling interface 20 of the respective damping apparatus 2. Coupling interface 19 is spherical. It defines coupling point P1.

Coupling point P1 is arranged in a fixed position in at least two degrees of freedom, particularly rotational degrees of freedom independently of the displacement of adjustment device 13. In this context, coupling point P1 arranged in a fixed position independently of a rotation of a first and a second axis B, C, wherein the first axis B and second axis C extend at an angle, particularly at right angles, to a third axis ft. The third axis D extends through the middle of coupling interface 19 and/or through coupling point P1 and through a connection 29 of coupling interface 19 with neck 16. In the embodiment of FIG. 5, t first axis B corresponds to first pivot axis B and second axis C corresponds to second pivot axis C. In this way, coupling point P1 is arranged in fixed location independently of the angle of rotation gamma ($\gamma$) of foot 15 about first pivot axis B and independently of the angle of rotation beta ($\beta$) of neck 16 about second pivot axis C.

Coupling interface 19 and/or coupling point P1 are permanently arranged at intersection X, particularly independently of the rotation of foot 15 about the first axis of rotation B and particularly independently of the rotation of neck 17 about the second axis of rotation C. IN this way, a relative angle can be configured between coupling interface 19 and mating coupling interface 20 independently of parameters such as variably configurable distances in the test stand 4, on the test frame 5 and/or on the rails 9 and the variably configurable center of gravity S. Thus it can be guaranteed that coupling point P1 is realistically positionable, and the respective damping apparatus 2 (FIG. 2) can be coupled thereto easily, quickly and with no resistance.

In the table below, the characteristic variables of the test frame as function model of the flap are listed,

| Reference number | Designation | Center of gravity | Mass [m] | Intrinsic moment of inertia [kgm] | Moment of inertia about P0 [kgm$^2$] |
| --- | --- | --- | --- | --- | --- |
| 5 | Test frame | rs | m0 | J0 | J0 |
| 7 | Connecting device | 0 | m0* | — | — |
| 13 | Adjusting device | r1 | m1 | J1 | J1 + m1 * r1$^2$ |
| 12 | Receiving device | r1 | m1, H | J1, H | J1, H + m1, H * r1$^2$ |
| 9 | Rails | r2 | m2 | J2 | J2 + m2 * r2$^2$ |

-continued

| Reference number | Designation | Center of gravity | Mass [m] | Intrinsic moment of inertia [kgm] | Moment of inertia about P0 [kgm$^2$] |
|---|---|---|---|---|---|
| 21 | First mass compensation device | r3 | M3 | J3 | J3 + m3 * r3$^2$ |
| 25 | Holder of the first mass compensation device | r3 | m3, H | J3, H | J3, H + m3, H * r3$^2$ |
| 22 | Second mass compensation device | r4, r5 | m4 | J4 | J4 + m4 * r2$^2$ |
| 26 | Holder of the second mass compensation device | r4, r5 | m4, H | J4, H | J4, H + m4, H * rs$^2$ + (m4 + m4, H) * Δr4$^2$ |

The static equivalence conditions between the tailgate and the test frame shall be calculated as follows, presuming the same masses of the tailgate and the test frame:

$$\sum_i m_i = m_k \Rightarrow \quad (1)$$

$$m0* + m1 + m1, H + m2 + m3 + m3, H + m4 + m4, H = mk$$

$$\Leftrightarrow$$

$$m0* = mk - m1 - m1, H - m2 - m3 - m3, H - m4 - m4, H$$

with $$0 \leq m0* \leq m0$$

And presuming the same centers of gravity of the flap and the test frame:

$$\frac{\sum_i r_i * m_i}{\sum_i m_i} = r_s \Rightarrow \frac{r1*(m1 + m1, H) + r2*m2 + r3(m3 + m3, H)}{m0* + m1 + m1, H + m2 + m3 + m3, H} = rs \quad (2)$$

$$(1) \text{ in } (2) \Rightarrow \frac{r1*(m1 + m1, H) + r2*m2 + r3(m3 + m3, H)}{mk - (m4 + m4, H)} = rs$$

$$\Leftrightarrow r3 = rs * \frac{mk - (m4 + m4, H)}{m3 + m3, H} - r1 * \frac{m1}{m3 + m3, H} - r2 * \frac{m2}{m3 + m3, H}$$

The dynamic equivalence conditions between the flap and the test frame are calculated as follows, presuming the same moments of inertia of the flap and of the test frame about the corresponding pivot axis:

$$\sum (J_i + m_i * r_i^2) = J_k \Rightarrow \quad (3)$$

$$J0* + J1 + J1, H + J2 + J3 + J3, H + J4 +$$

$$J4, H + \Delta J4 + (m1 + m1, H)*r1^2 + m2*r2^2 +$$

$$(m3 + m3, H)*r3^2 + (m4 + m4, H)*rs^2 = Jk$$

$$\Leftrightarrow$$

$$\Delta J4 = Jk - (J0 + J1 + J1, H + J2 + J3 + J3, H +$$

$$J4 + J4, H + (m1 + m1, H)*r1^2 + m2*r2^2 +$$

$$(m3 + m3, H)*r3^2 + (m4 + m4, H)*rs^2)$$

With reference to FIG. 6, the distance Δr4 of both weigh components 23, 24 from the center of gravity S shall be calculated as follows:

$$J4 = 2 * \left(\frac{1*m4}{8*2} * D4^2\right) = \frac{1}{8} * m4 * D4^2 \quad (4)$$

$$\Delta J4 = (m4 + m4, H) * \Delta r4^2$$

$$\Rightarrow$$

$$\Delta r4 = \sqrt{\frac{\Delta J4}{m4 + m4, H}}$$

(3) in (4)

$$\Rightarrow \Delta r4 = \sqrt{\frac{Jk - (J0 + J1 + J1, H + J2 + J3 + J3, H + J4 + J4, H + (m1 + m1, H)*r1^2 + m2*r2^2 + (m3 + m3, H)*r3^2 + (m4 + m4, H)*rs^2)}{m4 + m4, H}}$$

With reference to FIG. 4B, the position of the coupling point P1, in particular the distance r1 between the point P0 and the coupling point P1 and the distance h between the plane E and the coupling point P1 shall be calculated as follows:

$$r1 = \frac{rp1 * rs}{rs}$$

$$h = \sqrt{rp1^2 - rp0^2}$$

With reference to FIG. 5, the angles of rotation β and ϒ of the coupling point P1 through rotation of the foot 15 about the first axis of rotation B and/or through rotation of the neck 16 about the second axis of rotation C are calculated as follows:

$$\Upsilon = \arctan\left(\frac{J}{I}\right)$$

$$\beta = \arctan\left(\frac{K}{\sqrt{I^2 + J^2}}\right)$$

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A coupling device for coupling a damping apparatus to a test frame in a test arrangement for testing the damping apparatus, the coupling device comprising:
   an adjustment device having a coupling interface for coupling with the damping apparatus; and
   a receiving device for coupling with the test frame and configured to receive the adjustment device;
   wherein the coupling interface is variably configurable relative to the receiving device;
   wherein the coupling interface is displaceable by the adjustment device in at least two rotational degrees of freedom and defines a coupling point arranged in fixed manner independently of the displacement of the adjustment device in the at least two rotational degrees of freedom.

2. The coupling device according to claim 1, wherein the adjustment device comprises an engaging device configured to engage in the receiving device, wherein the engaging device is slideable in a first direction along the receiving device and in the reverse direction.

3. The coupling device according to claim 2, wherein the receiving device includes at least one recess and the engaging device includes at least one detent component securable in positive locking manner with the at least one recess, wherein a positive lock is created in a second direction extending at an angle to the first direction and reverse direction.

4. The coupling device according to claim 3, wherein the angle is a right angle.

5. The coupling device according to claim 1, wherein the adjustment device comprises a foot, which is connected to the receiving device, a neck supported on the foot, and a head connected to the neck.

6. The coupling device according to claim 5, wherein at least one of the foot and the neck has an L-shaped lateral profile.

7. The coupling device according to claim 5, wherein the head comprises the coupling interface, and wherein the head is spherical in shape.

8. The coupling device according to claim 5, wherein the foot is rotatable about a first axis of rotation relative to the engaging device and the neck is rotatable together with the head about a second axis of rotation relative to the foot.

9. The coupling device according to claim 8, wherein the foot and the neck are arranged in a kinematic chain, so that the neck is rotatable together with the foot about the first axis of rotation relative to the engaging device.

10. The coupling device according to claim 8, wherein the first axis of rotation and the second axis of rotation converge at an angle to each other and intersect at an intersection.

11. The coupling device according to claim 10, wherein the angle is a right angle.

12. The coupling device according to claim 11, wherein at least one of the coupling interface and/or the coupling point are arranged at the intersection independently of an angle of rotation of the foot about the first pivot axis.

13. The coupling device according to claim 12, wherein at least one of the coupling interface and/or the coupling point are arranged at the intersection independently of an angle of rotation of the neck about the second pivot axis.

14. The coupling device according to claim 11, wherein at least one of the coupling interface and/or the coupling point are arranged at the intersection independently of an angle of rotation of the neck about the second pivot axis.

15. A test arrangement for testing at least one damping apparatus for damping a tailgate that is pivotable about a tailgate pivot axis, the test arrangement comprising:
   a test bench having a pivot axis configured to simulate a tailgate pivot axis;
   a test frame configured as a functional model of the tailgate;
   a connecting device for connecting the test frame and test bench that is pivotable about the pivot axis;
   at least one damping apparatus for damped pivoting of the test frame about the pivot axis; and
   a coupling device including an adjustment device having a coupling interface for coupling with the damping apparatus, and a receiving device for coupling with the test frame and configured to receive the adjustment device, wherein the coupling interface is variably configurable relative to the receiving device;
   wherein the at least one damping apparatus includes a mating coupling interface for creating a coupling with the coupling interface of adjustment device;
   wherein a relative angle between the coupling interface and the mating coupling interface is variably configurable by displacement of the adjustment device in the at least two rotational degrees of freedom.

16. The test arrangement according to claim 15, wherein the test frame comprises at least one rail, wherein the coupling device is slideable along the rail so that a distance between at least one of the coupling device and the coupling point and the pivot axis is variably configurable.

17. The test arrangement according to claim 15, wherein the adjustment device comprises a foot and a neck, wherein the coupling interface is disposed on the neck, and wherein the relative angle is variably configurable by displacement of the foot through a first angle of rotation about a first pivot axis and by displacement of the neck through a second angle of rotation of the neck about a second pivot axis.

* * * * *